United States Patent Office 2,975,976
Patented Mar. 21, 1961

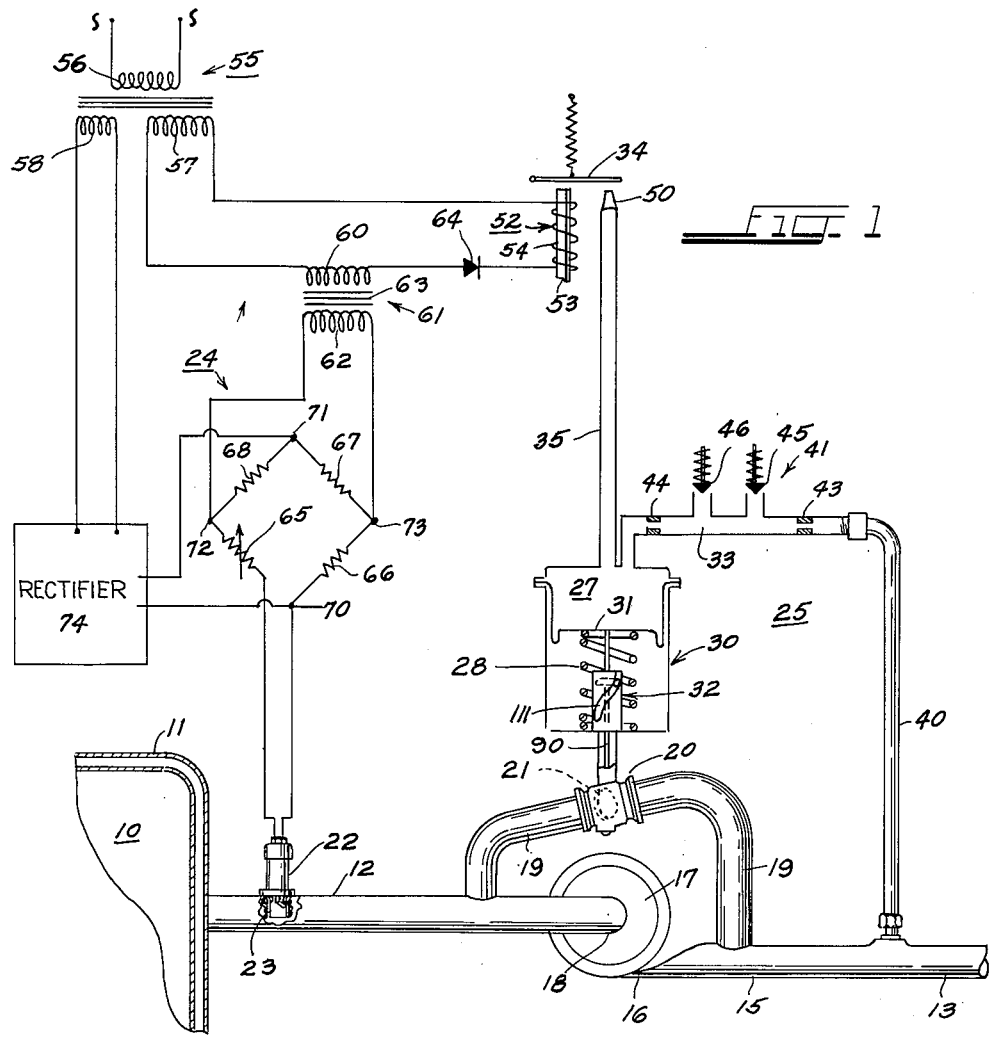
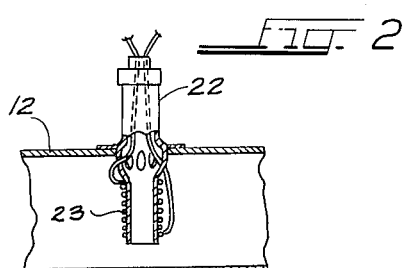

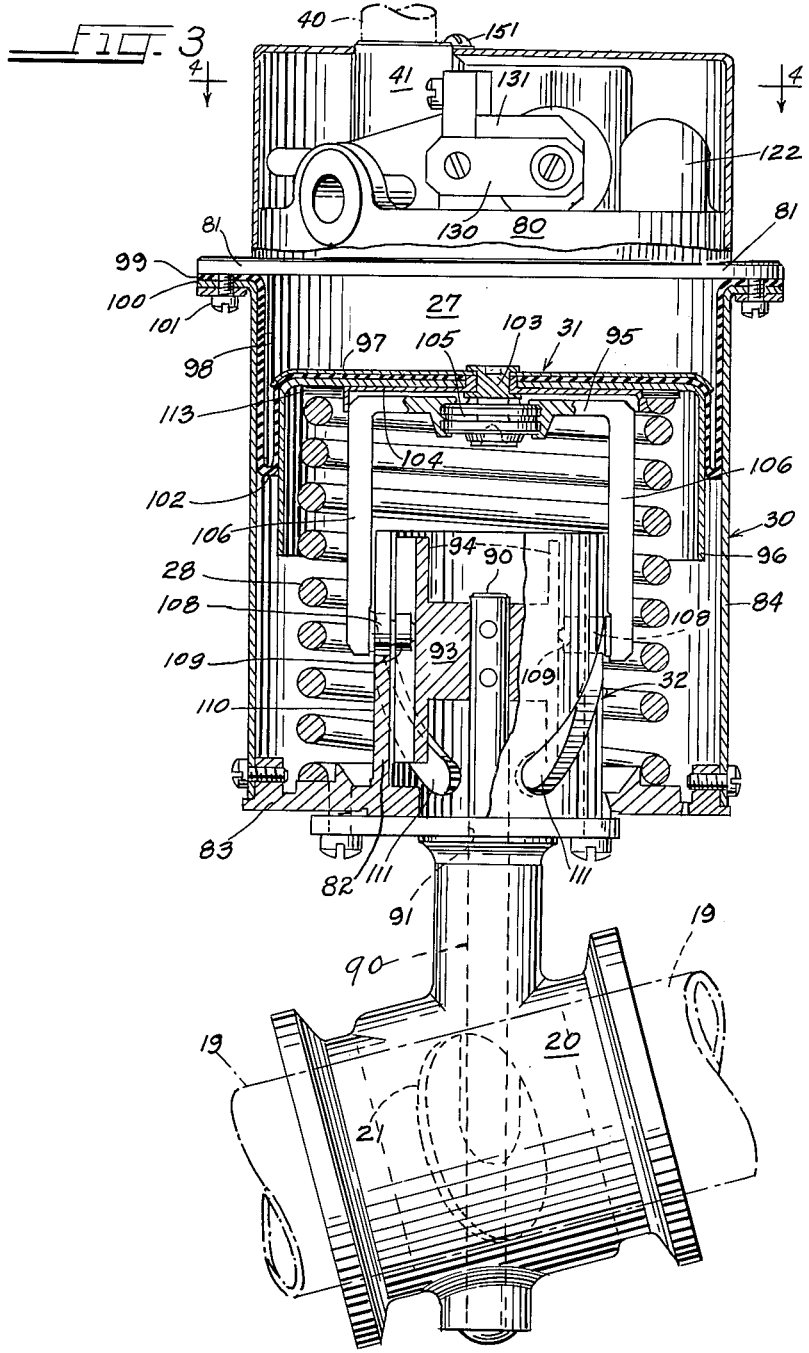

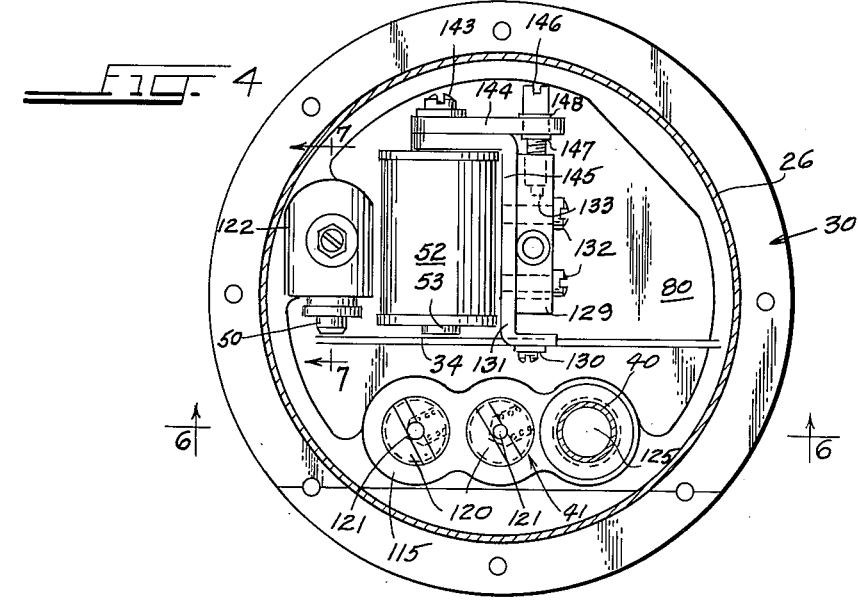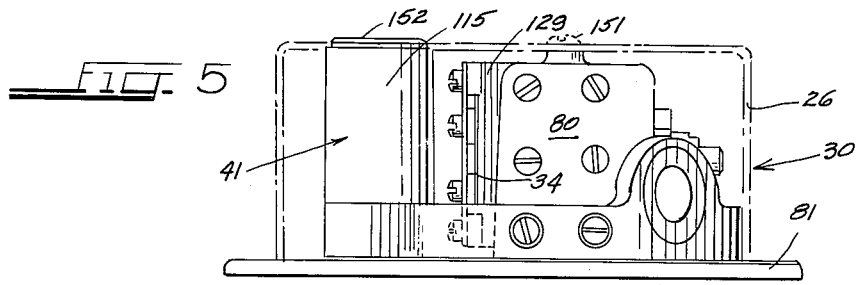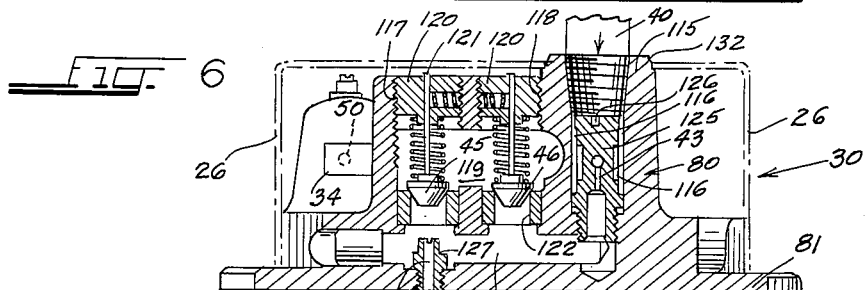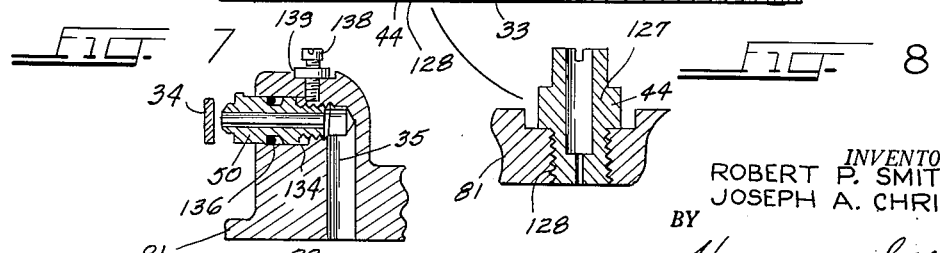

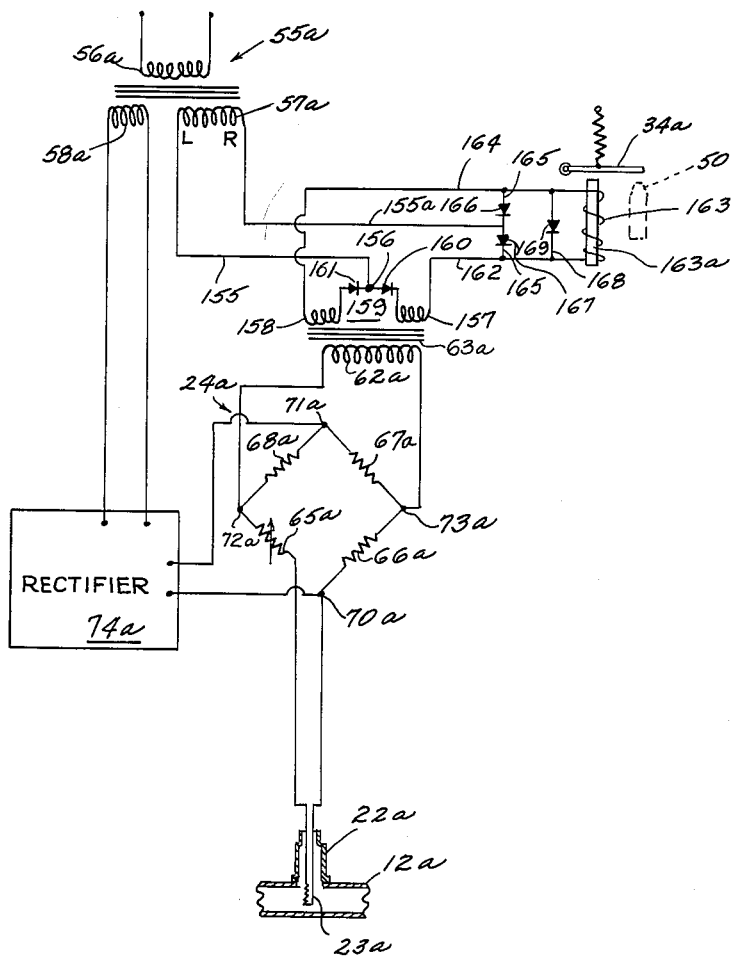

2,975,976

ELECTRO PNEUMATIC TEMPERATURE
CONTROL SYSTEM

Robert P. Smith and Joseph A. Christ, Chicago, Ill., assignors to Vapor Heating Corporation, Chicago, Ill., a corporation of Delaware Filed May 31, 1957, Ser. No. 662,844

2 Claims. (Cl. 236—78)

This invention relates to an electro-pneumatic temperature control system and more particularly to the construction and combination of a relatively simple and compact set of instrumentalities for modulating the delivery of heated air into a delivery conduit or an enclosure, as the case may be, the temperature of which is being controlled.

The system as illustrated herein is constructed for use in connection with means for controlling the temperature within an airplane cabin and/or the temperature within a conduit for delivering a mixture of hot and partially heated air into said cabin. However, it should be distinctly understood that other uses for the system are contemplated, for example the heating of railway cars, buses and other moving vehicles, as well as stationary enclosures.

According to the present invention, air heated from any source, for example a heat exchanger (not shown), is delivered, in suitable proportions, into an air delivery conduit wherein it is mixed with air of lower temperature to provide an air stream of a predetermined temperature for delivery into the cabin or other enclosure whose temperature is undergoing control.

The improved control system of the present invention is of an electro-mechanical nature since it includes a fluid pressure motor for operating a modulating control valve located in a hot air duct to control the amount of hot air supplied to a delivery duct. The operation of the fluid pressure motor is controlled by means of a bleed valve which is itself controlled by an electromagnet connected in a magnetic amplifier circuit in which the current flow is varied in relation to variations in the current flow from a Wheatstone bridge. The current flow from the Wheatstone bridge is varied by means of a temperature sensitive resistance interposed in one arm of the bridge and positioned to respond to the temperature of the air within said delivery duct.

The arm of the bridge containing the temperature sensitive resistance also contains a variable resistance whereby adjustment may be made for varying the temperature setting of the bridge circuit. The other arms of the bridge include fixed resistors which cooperate with the resistors in the first mentioned arm to maintain a desired condition in the bridge at a selected temperature setting.

Rectified current is supplied to opposite sides of the bridge from one of two secondary windings of a transformer. Connections from the other side of the bridge lead to opposite ends of a coil forming a part of the magnetic amplifier. Alternating current from the other secondary winding of said transformer is fed through a second coil constituting the output winding of said magnetic amplifier. The core of the amplifier is formed of an alloy having an extremely high saturation curve so that small changes in the applied control circuit from the bridge will materially affect its flux flow characteristics to thereby variably impede the flow of current through the output winding of the magnetic amplifier and thereby vary the magnetic force of the electromagnet for actuating the bleed valve.

The mechanical features of the present invention are largely pneumatic. The hot air stream, being supplied under pressure, is caused to perform useful work in driving a turbine and the exhaust air from the turbine, which undergoes a substantial temperature drop, is conducted by the delivery conduit, into the aircraft cabin or other enclosure undergoing temperature regulation. A by-pass conduit circumvents the turbine and the modulating control valve is disposed in the by-pass conduit so that it may perform its blending action as previously described by controlling the amount of hot air which is mixed with the lower temperature air in the delivery conduit before such mixture enters the said cabin or other enclosure. A small amount of air is withdrawn from the supply conduit and is conducted through a pressure regulator assembly of novel construction which serves to maintain a predetermined and potentially constant pressure in a passageway leading to the pressure motor. The pressure maintained in the pressure motor determines the extent of opening movements of the modulating control valve and this pressure is in turn controlled by the extent of the opening of the bleed valve. When the temperature within the delivery duct is below the temperature setting of the Wheatstone bridge, the current flow is decreased from the bridge to the magnetic amplifier and the current flow in the amplifier circuit is increased to increase the force of the bleed valve actuator magnet, whereby the bleed valve is adjusted to further restrict the bleed port, whereby there is a build-up of pressure in the fluid pressure motor and the control valve is adjusted to increase the volume of hot air supplied to the delivery conduit. When the temperature in the delivery duct rises toward the temperature setting of the bridge, the current flow from the bridge to the magnetic amplifier is increased and the current flow from the amplifier to the bleed valve actuator magnet is proportionately reduced, whereby the bleed valve moves to increase the opening of the bleed port, whereupon the control valve moves in a direction to reduce the volume of hot air supplied to the delivery conduit. The modulated adjustments of the control valve will continue until the electrical condition of the bridge is such that the control valve will remain stationary until a further change in temperature occurs within the air delivery conduit.

The provision of a temperature control system embodying the principles of operation briefly outlined above being among the principal objects of the invention, numerous other objects and advantages not at this time enumerated will become more readily apparent as the following description ensues.

In the accompanying four sheets of drawings forming a part of this specification two operative embodiments of the invention have been shown.

In these drawings:

Fig. 1 is a schematic view of the present control system showing the pneumatic control instrumentalities and a circuit diagram of the electrical control mechanism for operating the same;

Fig. 2 is a view partly in section of a temperature sensitive resistance shown diagrammatically in Fig. 1;

Fig. 3 is a side elevational view, partly in section, of a unitary, composite, assembly of electrical and mechanical parts employed in connection with the present control system and including the magnetically operable bleed valve, the control valve and the pressure regulator mechanism, all operatively enclosed within a common housing;

Fig. 4 is a sectional view taken substantially along the line 4—4 of Fig. 3;

Fig. 5 is a side elevational view of the structure shown in Fig. 4 with a portion of the housing being broken away to more clearly reveal the nature of the internal parts;

Fig. 6 is a sectional view taken substantially along the line 6—6 of Fig. 4;

Fig. 7 is an enlarged sectional view taken substantially along the line 7—7 of Fig. 4;

Fig. 8 is an enlarged sectional view through an orifice fitting employed in connection with the pressure regulator mechanism shown in Fig. 7; and Fig. 9 is a slightly modified circuit diagram capable of being substituted for the circuitry shown in Fig. 1.

Referring now to the drawings: The control system of the present invention is schematically shown in the form of an aircraft installation wherein the interior 10 of the aircraft cabin 11 is supplied with proportionately blended air of higher and lower temperature issuing from a delivery conduit 12. The source of heated air delivered to the conduit 12 may be air which is rammed through a conventional heat exchanger (not shown) by the movement of the aircraft or may be forced through a heat exchanger by a compressor. Ordinarily, the air issuing from such heat exchanger has a higher temperature than is desired for introduction into the airplane cabin or other space whose temperature is being regulated. Consequently, the hot air thus delivered from the heat exchanger is mixed with cooler air before it is delivered into the temperature controlled space. In some installations raw air may be mixed with the hot air so delivered. However, in the present installation, the hot air issuing from the heat exchanger (not shown) is passed through conduit 15 which communicates with the intake side 16 of a turbine 17. The turbine constitutes a unit of the aircraft equipment and is normally operated by air rammed through the turbine by the forward movement of the aircraft or by a compressor not shown, the turbine being utilized to perform useful work, as for example the driving of a blower fan or the like.

Inasmuch as the turbine 17 will normally function to remove a major portion of the heat from the air delivered to it from the conduit 15, this partially cooled air is blended with the relatively hot air delivered to the conduit 12 through a by-pass conduit 19 leading from the hot air conduit 15.

The blending of the hot air from the by-pass conduit 19 with the cooler air from the turbine is effected by means of a control valve assembly 20 including a valve element proper 21 interposed in the by-pass conduit 19 to vary the flow of hot air through the by-pass conduit for blending purposes. The control valve 21 is operated under the control of a heat-responsive resistance unit 22 having a resistance proper 23 disposed within the conduit 12 directly in the path of flow of the blended air. The electrical control instrumentalities, of which the resistance element 23 forms a part, and the pneumatic control instrumentalities, of which the valve element 21 forms a part, together serve to effect the necessary control operation and, in Fig. 1, these electrical and pneumatic control mechanism have been designated respectively and in their entirety at 24 and 25. The electrical devices 24 may be suitably mounted in a compact arrangement on a control panel or in a control box (not shown) requiring but little space, while all of the essential elements of the pneumatic mechanism 25 is conveniently constructed as a unitary assemblage of parts, all mounted within a substantially sealed casing and constituting a "package unit" as illustrated in Figs. 3, 4, 5 and 6.

Still referring to Fig. 1, the opening and closing movements of the valve element 21 are regulated by means of a pneumatic motor which is designated in its entirety at 30. This motor is of the piston-actuated type and includes a spring pressed diaphragm-sealed piston 31 within a piston chamber 27, the linear movements of which are translated into rotary turning movements of the valve element 21 by a cam mechanism 32. Normally, the valve 21 is closed by a spring 28 in the absence of a heat demand. However, when the temperature within the duct 12 falls below the temperature setting of the electrical control instrumentalities 24 the temperature sensitive winding 23 functions to activate said electrical control instrumentalities to progressively close a magnetically operated bleed valve 34. Progressive closing of the bleed valve serves to increase the pressure normally maintained within a bleed passage 35 and the piston chamber 27. Consequently the piston 31 moves in a direction to impart an opening movement to valve 21 and thereby increases the flow of hot air through the by-pass conduit 19 and thereby increases the proportion of hot air mixed with the cold turbine exhaust air and delivered to the enclosure 10.

In order to normally maintain a predetermined constant pressure within the bleed pipe 35, and consequently within the piston chamber 27, a portion of the high pressure ram or compressor air within the supply conduit 15 is withdrawn through a conduit 40 and introduced into a pressure regulator assembly 41 which has been illustrated in Fig. 1 as being in a position remote from the unit 30 but which actually is assembled within a casing 26 (Figs. 3, 4 and 5) with the other instrumentalities 50 and 34. The pressure regulator 41 provides a flow path (a chamber 33) in which a substantially constant pressure is maintained to supply pressure to the piston chamber 27. The constant pressure chamber 33 includes a pair of spaced orifice fittings 43 and 44 at the entrance to and at the exit from said flow path. A pair of spring pressed relief valves 45 and 46 are arranged in parallel relation in the pneumatic circuit between the serially arranged orifice fittings 43 and 44 and these valves jointly serve to relieve excess pressure within the chamber 33 or flow path. The orifice fitting 43 is so designed as to permit a predetermined proportionate pressure drop across the same and the orifice 44 is preferably of smaller capacity than the orifice fitting 43 so that, under normal operating conditions, there will always be a tendency for a certain amount of pressure to build up within the chamber or flow path 33. In order to maintain constancy of pressure within the piston chamber 27 when the bleed valve 34 is closed, the pressure developed within the flow path 33 should at least equal or slightly exceed the spring pressure exerted by the pressure relief valves 45 and 46 and these latter valves, by their bleeding action will reduce the pressure in the flow path to substantially a predetermined constant. In this manner, the second serially arranged orifice 44 will operate to deliver air into the piston chamber 27 and thence into passage 35 from a body of air that already is substantially constant so that, with the bleed valve 34 closed, a high degree of pressure constancy is maintained in the bleed passage 35 and in the piston chamber 27.

Still referring to Fig. 1 and in particular to the electrical instrumentalities 24 illustrated therein, the bleed valve 34 comprises essentially a bleed nipple 50 (Figs. 4 and 7) at one end of the bleed passage 35 and having associated therewith a spring biased flapper type valve element 34 which actually is in the form of an armature capable of being attracted by an electromagnet 52 including a core 53 and a winding 54. Means are provided for varying the flow of energizing current through the winding 54 in accordance with the demand for heat in the delivery conduit 12 so that the magnetic field in the vicinity of the armature or valve element 34 is varied and thereby vary the pulling effect on the latter to move it toward its closed position to thus vary the amount of air bled from the bleed passage 35.

Accordingly, the winding 54 is disposed in a local secondary circuit associated with a transformer 55 having a primary winding 56 and two secondary windings 57 and 58 respectively. The winding 57 is disposed in the local secondary circuit in series with the winding 54 and with an output winding 60 of a magnetic amplifier designated in its entirety at 61. The magnetic amplifier 61 further includes a second or control winding 62 wound on a common core 63 with the winding 60. The core 63 is formed of a known alloy having high sensitivity to small changes in the flow of direct current through the winding 62. Consequently the core 63 has the characteristics of reaching a condition of magnetic de-saturation rapidly with but little increase in current flow through the winding 62. A rectifier 64 is also disposed in the local secondary circuit between the windings 60 and 54 and serves to increase the efficiency and sensitivity of the amplifier by preventing reverse or negative alternating current impulses from de-magnetizing the core 61 so that the current passing through the control winding 62 may exert its full de-saturation effect upon the core 61 unimpeded.

In order to vary the flow of direct current through the control winding 62 of the magnetic amplifier 61 in response to the variation of resistance in the temperature-responsive resistor element 23 in the air delivery conduit 12, this resistance element is connected in series with a variable resistor 65, the latter constituting a temperature selector and the two resistances constituting one arm of a Wheatstone bridge circuit. The other arms of the bridge include three resistors 66, 67 and 68. The current input terminals of the bridge are designated at 70 and 71 and the output terminals are designated at 72 and 73. The latter terminals are connected to the ends of the control winding 62. The input terminals 70 and 71 of the bridge are connected to the output of a rectifier unit 74 which receives an alternating current input from the secondary winding 58 of the transformer 55.

From the above description it will be appreciated that when the temperature in the delivery duct 12 exceeds the temperature for which the selector winding 65 is set, the combined resistance of resistors 65, 23 and 68 will increase due to the increase in the resistance in the winding of resistor 23. The difference in potential between the output terminals 72 and 73 of the bridge is thus increased due to the increased difference between the combined resistance of resistors 65, 23 and 68 and the combined resistance of fixed resistors 66 and 67 of the bridge. The increased difference in potential mentioned above results in an increase of current flow in the control winding 62 of the magnetic amplifier 61. This increased flow of current de-saturates the core 63 of the magnetic amplifier and consequently increases the impedance of the output winding 60 so as to decrease the current flow in the winding 54 of the electro magnet 52 for actuating the bleed valve flapper 34. Consequently, the magnetic force exerted by the electro magnet 52 on the bleed valve 34 will decrease, causing the bleed valve to move away from the bleed nipple 50 and thereby decrease the pressure in the bleed port 35 and piston chamber 27. The decrease in pressure in the piston chamber 27 permits the piston 31 to move in the direction in which the piston spring is urging it. This movement of the piston imparts a closing movement to the valve 21 and thereby decreases the delivery of hot air through the by-pass 19 and consequently decreases the proportion of hot air mixed with the cold turbine exhaust air which is being delivered through the conduit 12 into the enclosure 10.

It will be apparent that when the temperature within the delivery conduit 12 reaches substantially the temperature setting of the Wheatstone bridge, the bridge output current and the positions of the bleed valve 34, piston 31 of the fluid pressure motor, and valve 21, are constant and will remain constant until the temperature in conduit 12 changes and thereby alter the resistance of the winding 23 of the bridge.

From the above description, rendered in connection with Fig. 1, it is thought that the nature and mode of operation of the present temperature control system will be understood. It remains therefore to describe the specific forms of the various penumatic devices illustrated in Figs. 1 to 8 inclusive together with their environmental association in the small and compact "package type" unit which has been shown in assembled form in Fig. 3.

The bleed valve 34, the pressure regulator assembly 41, the pressure motor assembly 30 and the control valve assembly 20 are assembled in a single unit. The electrical devices of the system are, as previously mentioned, preferably enclosed in a control box of suitable design while the turbine 17 is a separate mechanism.

Referring now to Fig. 3, the above mentioned unit involves in its general organization an upper casting 80 of hollow design having a base flange 81, and a lower casting 82 of generally hollow cylindrical design having a base flange 83. The base flanges 81 and 83 are both circular and are connected together by an outer cylindrical shell or casing 84 defining the previously mentioned internal piston chamber 27. The upper casting 80 constitutes a unitary body portion for the bleed valve 34 and the pressure regulator assembly 41 while the lower casting 82 constitutes an anchorage for the casing 20 of the control valve 21. As will be set forth presently, the casing 84 encloses the pressure motor 30 by means of which the control valve element 21 per se is actuated.

The control valve element 21 is mounted on the lower end of a valve shaft or stem 90, the latter being turnably mounted within a bore 91 provided in the base of the casting 82. The upper end of the stem 90 carries a spider-like crosshead 93 having oppositely disposed vertically slotted guide arms 94 and by means of which rotary motion of the crosshead, and consequently the control valve element 21, may be received from an actuating yoke 95 rotatably carried on the previously mentioned piston head 31 within the casing 84.

The piston head 31 includes an inner cup-shaped apron or stiffening member 96 and an outer cap member or plate 97, the two members serving to clamp therebetween the medial regions of a flexible diaphragm 98 which may be formed of rubber or a similar elastomeric material. The diaphragm, as formed and in its free state, is of deep cup-shape design and the outer rim thereof is turned laterally as at 99 and is effectively and sealingly clamped to the underneath side of the base flange 81 of the casting 80 and is held thereagainst by a laterally turned flange 100 on the casing 84, suitable clamping screws 101 serving to hold the various parts in clamped position. The diaphragm is reversed upon itself to provide a reentrant portion 102 between the cylindrical wall of the apron-like piston element 96 and the inner surface of the casing 84 and thus the piston assembly 31 is effectively sealed within the casing 84 to render the pressure chamber leak-proof although expansible and contractible as the piston moves within the casing. The various piston parts are held together by means of a central rivet 103 and also included in the riveted assembly is a plate 104 from which there depends a central hub 105 which serves to rotatably support the yoke 95. The yoke 95 is formed with a pair of depending oppositely disposed side arms 106 each of which is provided at its lower end with an outer roller 108 and an inner roller 109.

The lower casting 82 is formed with an upstanding cylindrical wall 110 having formed therein a pair of oppositely disposed curved or spiral slots 111 of like pitch for receiving the outer rollers 108. The inner rollers extend into the vertical slots provided in the guide arms 94. A coil spring 28 has its lower end seated on the base flange 83 of the lower casting 82 while its upper end bears against a ring 113 which surrounds the plate 104 and in turn bears upwardly against the underneath side of the piston assembly 31.

From the above description it will be seen that as the pressure of air within the expansible pressure chamber 27 varies due to the admission or the exhaust of air into and out of the said chamber, through the orifice of an orifice fitting 44 (Fig. 6) movement of the piston assembly 31 in one direction or the other will take place. When the piston moves downwardly under the influence of an increase of pressure within the chamber 27 it will carry with it the yoke 106 and the outer rollers 108 will be guided in the stationary fixed slots 111 in such a direction that the inner rollers 109, sliding in the guide arms 94, will turn the crosshead 93, stem 90 and control valve element 21 in a direction tending to open the valve 20. Conversely, when due to decreased pressure within the chamber 27, the piston assembly 31 moves upwardly, the camming arrangement just described will operate to move the control valve 21 toward its closed position.

Referring now to Figs. 2 to 5 inclusive, the pressure regulator assembly 41 exists as a part of the said package unit by virtue of the upper casting 80 which is formed with an upstanding hollow enlargement 115 through which there extends a vertical bore 116 (Fig. 6) the lower end of which communicates through the chamber 27 with the space 33 previously designated as the flow path of the pressure regulator 41 as described in connection with the schematic illustration of Fig. 1. Additional vertical bores 117 and 118 communicate with a common exhaust space 119 and threadedly receive therein guide plugs 120 in which the stems 121 of the two pressure relief valves 45 and 46 are slidable. The valves 45 and 46 cooperate with seat inserts 122 at the bottom of the exhaust space 119 and by means of which communication between the flow paths 33 and 119 is established.

The orifice fitting 43 of Figs. 1 and 6 leading into the flow path 33 is in the form of a removable nipple 125 threadedly received at the bottom of the bore 116. The nipple 125 is slotted as at 126 to facilitate insertion and removal of the same from the bore 116 so that different nipples having varying sizes of orifices may be substituted for different installations. The orifice fitting 44 of Fig. 1 is in the form of a removable nipple 127 (see also Fig. 8) threadedly received in a hole 128 which establishes communication between the flow path 33 and the interior of the pressure chamber 27.

The bleed valve assembly 34 is best illustrated in Figs. 4 and 7 wherein the electromagnet 52 which controls the operation of the valve is shown as being adjustably supported from a lug 129 which may be integral with the casting 80 or affixed thereto. The valve element proper 34 itself constitutes the armature of the electromagnet 52 and consists of an elongated flat strip of resilient magnetically attractable material which is clamped intermediate its ends as at 130 to one end of an L-shaped bracket 131 adjustably clamped to the lug 129 by means of clamping screws 132 which pass through slots 133 formed in the latter. One end of the armature 34 cooperates with the open end of the orifice nipple 50 of the bleed valve assembly 54 and this nipple as shown in Fig. 7 is threadedly received in a horizontal bore 134 formed in an upstanding enlargement 135 provided on the casting 80. The other end of the armature is free and lends a stabilizing effect to the armature as a whole to prevent unwarranted vibration thereof. The nipple 50 may be sealed to the walls of the bore by means of a conventional resilient O ring 136 disposed within an annular groove provided in the nipple body. A set screw 138 having a lock nut 139 associated therewith serves to anchor the nipple in any desired position of adjustment. The projecting portion of the nipple 50 is formed with a non-circular head which may be hexagonal, to facilitate axial adjustment of the nipple within the bore 134 to permit relative positioning of the nipple and armature 34. The bore 134 communicates with a vertical bore 35 formed in the casting 80 and this latter bore in turn communicates through the bottom of the casting with the interior of the pressure chamber 33.

Still referring to Figs. 4 and 7, means are provided for adjusting the axial position of the electromagnet 52 in order that the core 53 thereof may be brought into varying degrees of proximity to the armature 34 to thus vary the strength of the magnetic field offered by the electromagnet 52 to the armature in all of the positions of which it is capable. Accordingly, one end of the magnet core 53 has secured thereto by means of a clamping screw 143 an adjusting bracket 144 and an L-shaped limit stop bracket 145. An adjusting screw 146 passes through the free end of the bracket 144 and has its end threadedly received in one end of the lug 129. The screw 146 has the usual stop shoulder and snap ring arrangement 147, 148 to cause the bracket 144 to follow the axial shifting movements of the screw into and out of the lug 129. It will be seen that as the adjusting screw 146 is turned in one direction or the other the electromagnet 52 as a whole, together with the brackets 144 and 145, will move bodily toward and away from the armature 34. The free end of the limit stop bracket 145 is designed for contact with an end of the bracket 131 to limit the degree of advance movement of the electromagnet toward the armature 34.

As shown in Figs. 3, 5 and 6, the casting 80, together with its associated instrumentalities just described, is adapted to be enclosed by a cover 26 of cup-shaped design. The lower rim of the cover seats on the base flange 81 and an anchoring screw 151 passes through the top of the cover and is threadedly received in the lug 115 formed on the casting 80. The top of the cover has an opening 152 therethrough to accommodate passage of the conduit 40 (Figs. 1 and 6) therethrough for reception in the bore 116 (Fig. 6).

The modified circuit shown in Fig. 9 is designed to effect full wave rectification of an alternating current from a transformer so that the alternating impulses of the current may pass in a unidirectional path through an electro magnet associated with a bleed valve structure. This modified circuit includes a transformer which is of the same construction as the transformer 55 shown in Fig. 1. However, for purpose of identification the transformer of the modified circuit is identified by the reference character 55a. It comprises a primary winding 56a and two secondary windings 57a and 58a. The end designated L of the winding 57a is connected by means of conductor 155 with a center tap 156 between a pair of output windings 157 and 158 of a magnetic amplifier 159. The central tap 156 is located between a pair of rectifiers 160, 161. A conductor connects the rectifier 160 with one end of the output coil 157. The other end of this coil is connected by conductor 162 to the input end of an electromagnet 163. The other end of the electromagnet winding 163 is connected by means of a conductor 164 to the input end of the magnetic amplifier coil 158, the other end of which is connected through rectifier 161 to said central tap. A transverse conductor 165 having two opposed rectifiers 166 and 167 therein is connected across the conductors 162 and 164. A point intermediate the rectifier 166, 167 is connected to the end R of the transformer secondary coil 57a. A second transverse conductor 168 having a single rectifier 169 therein is connected across the conductors 162 and 164 at a location intermediate the cross connector 165 and the electromagnet 163. The cross connection 168 and rectifier 169 serves to smooth out the build-up and die out of the current in the winding of the electromagnet 163. The electromagnet 163 includes a core 163a which, when energized, functions in the same manner as electromagnet 52 of Fig. 1 to attract the flapper element 34 of the bleeder valve shown in Fig. 1 and thereby vary the discharge of air from the bleeder nozzle 50 in relation to the variable energy of the electromagnet 163.

The magnetic amplifier 159 includes a control winding 62a which is wound on the same core 63a of the amplifier and is supplied with direct current signals of varying intensity from a temperature sensing bridge which is constructed and function identically as described in connection with Fig. 1. Inasmuch as all elements and functions of the bridge circuit of the modified circuit in Fig. 9 are the same as those shown in Fig. 1, the bridge in Fig. 9 and its associated elements are, for the sake of brevity, designated by the same reference numerals plus an exponent "a."

The functioning of the modified circuit is as follows: The alternating current impulses leaving the end L of the secondary winding 57a of the transformer 55a follows the conductor 155 to the central tap 156 between the opposing rectifiers 160, 161. The current impulses will pass through the rectifier 160, the coil 157 and thence through conductor 162 to the input end of the winding 163 of the electromagnet and thence through conductors 164, rectifier 166 and conductor 155a to the end R of the secondary winding 57a. The electrical impulses discharged from the end R of the secondary winding 57a follow through the conductor 155a to its connection with conductor 165 between opposing rectifiers 166, 167. The current passes through the rectifier 167 and follows the conductor 162 through the winding 163 of the electromagnet, then follows the conductor 164 to the input end of coil 158 of the electromagnet amplifier and passes through rectifier 161 and conductor 155a to the end L of the transformer winding 157a.

The functioning of the magnetic amplifier to control the output of current from the coils 157, 158 is effected in the same manner as described in connection with Fig. 1. That is to say, the saturation of the core 63a is varied by varying the flow of direct current through the control coil 62a of the amplifier. This control is effected by the variations in the resistance of the temperature sensitive resistor 23a. For example, when the temperature in the duct 12 exceeds the temperature setting of the bridge (selector resistor 65a) a difference in potential is created between the output terminals 72a, 73a of the bridge. This increased difference in potential results in an increase of current flow through the control winding 62a of the magnetic amplifier and thereby proportionately de-saturates the core 63a thereof, thereby increasing the impedance of both windings 157–158 of the amplifier and consequently reducing the flow of current through the winding of the electromagnet 163. In response to this reduced flow of current through the electromagnet the flapper of the bleed valve 34a moves by or away from the discharge port of the bleed nipple 50 and thereby decreases the pressure in the piston chamber 27 so as to permit the piston 31 to move in the direction in which the piston spring 28 is urging it. When the temperature in the delivery duct falls below the temperature setting of the selector winding 65a of the bridge, the combined resistors 23a, 65a and 66a will decrease relative to the resistors 66a and 67a so as to create a difference in potential between the output terminal 72a, 73a, the difference in potential resulting from this change in the resistance of the bridge decreases the current flow in the control winding 62a of the magnetic amplifier and thereby results in proportionately increasing the saturation of the core 63a so as to increase the current flow through the output coils 157, 158 and correspondingly increase the effectiveness of the electromagnet 163 so as to draw the flapper 134a of the bleed valve closer to the discharge end of the bleed nozzle 50. This condition results in increasing the pressure in the piston chamber 27 so as to move the piston in opposition to the pressure of the spring 28 and thereby move the valve 21 to increase the volume of hot air delivered into duct 12.

We claim:

1. In a temperature control system wherein means comprising a valve and operating mechanism therefor deliver variable amounts of heated air into an enclosure whose temperature is being controlled; means including a magnetically controlled element for regulating the said valve operating mechanism in relation to the temperature within said enclosure and comprising an electro-magnet having a winding for imparting progressive increments of motion to said element to an extent proportional to the strength of the magnetic flux developed in said electro-magnet winding; electrical means for energizing said electro-magnet comprising a transformer having a secondary winding, an electro-magnetic amplifier including a pair of output coils and a control winding therefor; a full wave rectification circuit for electrically connecting the transformer, the electro-magnetic amplifier and said electro-magnet comprising a connector provided with a pair of opposed rectifiers therein and leading from the output end of one of said pair of output coils to the input end of the other output coil, a connector leading from a point intermediate said opposed rectifiers to one end of the transformer secondary winding, a connector leading from the output coil of said pair to the input end of said electro-magnet winding, a connector leading from the output end of said electro-magnet winding to the input end of the first mentioned coil of said pair, a second pair of opposed rectifiers connected across the input and output ends of said electro-magnet winding and a connector leading from the other end of the transformer secondary winding to a point between the last mentioned pair of rectifiers; a source of direct current; means for passing variable amounts of current from said source through said control winding including a bridge having its input terminals connected to said direct current source, its output terminals connected to said control winding and having a temperature sensitive resistance connected in one arm of the bridge and responsive to the temperature within said enclosure to vary the flow of electrical current through the bridge to said control winding and thereby vary the magnetic force of said electro-magnet; and a manually adjustable temperature selector resistance connected in the bridge arm containing said temperature sensitive resistance.

2. A temperature control system as defined in claim 1 characterized by a uni-directional connection having a single rectifier therein connected across the input and output ends of said electro-magnet intermediate the electromagnet and the connector containing the last mentioned pair of opposed rectifiers.

References Cited in the file of this patent

UNITED STATES PATENTS

| 623,873 | Borden | Apr. 25, 1899 |
| 2,118,248 | Keinatt | May 24, 1938 |
| 2,171,348 | Schneider | Aug. 29, 1939 |
| 2,220,176 | Rosenberger | Nov. 5, 1940 |
| 2,315,775 | D'Arcey | Apr. 6, 1943 |
| 2,389,082 | Rhoads | Nov. 13, 1945 |
| 2,403,917 | Gille | July 16, 1946 |
| 2,710,724 | McMahon | June 14, 1955 |
| 2,729,394 | Peterson et al. | Jan. 3, 1956 |
| 2,742,916 | Side | Apr. 24, 1956 |
| 2,810,526 | Rogers | Oct. 22, 1957 |

FOREIGN PATENTS

| 1,096,839 | France | Feb. 9, 1955 |
| 736,985 | Great Britain | Sept. 14, 1955 |